Patented Aug. 4, 1931

1,817,120

UNITED STATES PATENT OFFICE

JOHN E. AWAD, OF NEWARK, NEW JERSEY

FUR TREATING COMPOSITION AND PROCESS OF MAKING SAME

No Drawing. Application filed June 13, 1929. Serial No. 370,731.

This invention relates, generally, to fur treating compositions; and the invention has reference, more particularly, to a novel fur treating or carroting composition that is especially adapted for treating fur in preparation for the manufacture of felt therefrom.

Fur or similar material as it comes from the animal is not suitable for immediate use in the manufacture of felt owing to the animal grease and other foreign matter adhering to the individual hairs of the fur. Such grease and foreign matter substantially covers and hides the minute barbs or scales overlying the surface of the hairs and renders them rather smooth and slippery so that they do not readily cling together. In the formation of felt from fur or the like it is necessary that the individual hair fibres should overlap and interlock with one another, and to effect such interlocking and working together of the fibres it is essential to remove the grease and other foreign matter adhering to them so that their barbs are exposed for engaging one another in interlocked relation.

The principal object of the present invention is to provide a novel fur treating or carroting composition that is adapted to quickly and thoroughly remove grease and other foreign matter from fur and the like preparatory to the manufacture of felt therefrom, while at the same time rendering the individual fur fibres tough, pliable and of attractive appearance.

Another object of the invention lies in the provision of a novel composition of the above character that is readily and easily compounded and which is highly efficient and satisfactory as well as substantially free from objectionable or harmful characteristics in use, and which enables a relatively low grade of raw material to be finished so as to produce felted articles of high quality.

Other objects of this invention not at this time more particularly enumerated, will be clearly understood from the following detailed description of the same.

According to the preferred form of the invention, the novel carroting composition comprises a solution of nitric acid and mercury to which is added ammonium hydroxide solution in such manner and in such quantity as to produce a resulting fur cleansing and purifying composition that is free from objectionable strong acid or basic reactions when applied to fur and the like and which quickly and sufficiently cleanses and conditions the same without disintegrating the material of the fur and which gives the fur a high gloss and especially adapts the same to take and retain dyes. Also, owing to the neutralizing action of the ammonium hydroxide solution upon the acid solution of mercury, the novel carroting composition of this invention will not give off poisonous or objectionable vapors during the processes involved in the manufacture of the felt or in the formation of articles, such as hats therefrom.

As an example of the composition of this invention, the ingredients are mixed together in the following proportions by weight:—

| | Parts |
|---|---|
| Nitric acid (40° Baumé solution) | 80 |
| Mercury | 16 |
| Ammonium hydroxide solution (14% ammonia) | 1 |

The preferred manner of preparing the composition is as follows:—

To a five pound, 40° Baumé solution of nitric acid is added one pound of metallic mercury. The mercury is mixed into the nitric acid solution and the resulting mixture is allowed to stand from 24 to 144 hours depending upon the rapidity of the reaction taking place between the nitric acid and mercury which reaction results in the combining of the mercury with the acid solution to form essentially nitrates of mercury. To the resulting liquid mixture is then added one ounce of ammonium hydroxide (14% ammonia and 86% water).

The ammonium hydroxide ingredient or content listed in the above table is approximate only and may be varied within reasonable limits owing to the varying strengths of commercial ammonia in water solutions as purchased on the market. Thus when using strong commercial solutions of ammonia in water or ammonium hydroxide, it will be found that one-half ounce of ammonium hydroxide will be sufficient in making up the above mixture; greater quantities of ammonium hydroxide being needed in accordance with the weakness of the ammonium hydroxide solution of the cloudiness of the mercury-acid mixture. Thus, desirable results are obtained when an ammonium hydroxide solution containing from 13% to 20% of ammonia and 87 to 80% of water is used. In this case, the ammonium hydroxide ingredient of the above formula may be varied from one quarter to one and one-half parts depending on the strength of ammonium hydroxide solution.

Satisfactory results cannot ordinarily be obtained by pouring the ammonium hydroxide solution into the mercury-acid mixture and it is necessary that the ammonium hydroxide solution be introduced from below the liquid surface of the mercury-acid mixture. If desired, the ammonium hydroxide solution could be introduced into the mercury-acid container by means of a suitable pipe or conduit having its inlet positioned below the liquid surface level.

While there is given above an illustrative table of relative proportions of the several ingredients of the composition, it will be understood that variation of the stated proportions may be made within reasonable limits. As has been pointed out, the quantity of ammonium hydroxide solution may be varied within rather wide limits depending upon the strength of the ammonia in water solution and the cloudiness of the mercury-acid mixture. Also, by increasing the relative proportion of acid while keeping the remaining constituents the same, the reaction between the mercury and acid is speeded up and the final carroting composition is of greater penetrating quality. Changes in the mercury ingredient within reasonable limits may be also made while still attaining the purpose and function of the composition within the scope and spirit of this invention.

What is claimed is:—

1. A fur treating composition for removing the foreign matter from fur fibres and the like preparatory to felting comprising a solution resulting from the admixture of a major proportion of nitric acid, a lesser proportion of mercury and aqueous ammonium hydroxide.

2. A fur treating composition resulting from the mixture of the herein named ingredients in the approximate proportions as follows:

| | Parts |
|---|---|
| Nitric acid (40° Baumé solution) | 80 |
| Mercury | 16 |
| Ammonium hydroxide solution (14% ammonia) | 1 |

3. A fur treating composition resulting from the mixture of the herein named ingredients in the approximate proportions as follows:

| | Parts |
|---|---|
| Nitric acid (40° Baumé solution) | 80 |
| Mercury | 16 |
| Ammonium hydroxide solution (14% ammonia) | 1 | plus water in sufficient quantity to cause the composition to have a specific gravity of substantially 12° Baumé.

In testimony, that I claim the invention set forth above I have hereunto set my hand this 11th day of June, 1928.

JOHN E. AWAD.